United States Patent [19]

Bartoli et al.

[11] Patent Number: 6,047,268

[45] Date of Patent: Apr. 4, 2000

[54] METHOD AND APPARATUS FOR BILLING FOR TRANSACTIONS CONDUCTED OVER THE INTERNET

[75] Inventors: Paul D. Bartoli, Red Bank; Stephen J. Griesmer, Westfield; Gideon Lidor, East Brunswick; Yzhak Ronen, West Windsor; Jean Tessier, Atlantic Highlands, all of N.J.

[73] Assignee: A.T.&T. Corporation, New York, N.Y.

[21] Appl. No.: 08/964,274

[22] Filed: Nov. 4, 1997

[51] Int. Cl.[7] .................................................... G06F 17/60
[52] U.S. Cl. .............................. 705/35; 705/40; 713/153
[58] Field of Search .................................... 705/35, 39, 40, 705/42, 44; 380/24; 235/379, 380

[56] References Cited

U.S. PATENT DOCUMENTS

| | | | |
|---|---|---|---|
| 5,481,611 | 1/1996 | Owens et al. | 380/25 |
| 5,748,740 | 5/1998 | Curry et al. | 380/25 |
| 5,774,525 | 6/1998 | Kanevsky et al. | 379/88.02 |
| 5,845,267 | 12/1998 | Ronen | 705/40 |
| 5,875,296 | 2/1999 | Shi et al. | 395/168.01 |

*Primary Examiner*—Kevin J. Teska
*Assistant Examiner*—Demetra R. Smith

[57] ABSTRACT

A method and apparatus for authenticating transactions accomplished over a data network utilizes a "cookie" containing both static information (user-identifying information) and dynamic information (transaction-based information). The transaction-oriented dynamic information portion comprises a random number and a sequence number, the latter tracking the number of billing transactions conducted by the user associated with the account number. The cookie, sent to the user's cookie file upon a previous transaction, is valid for only a single new transaction. A billing server, upon receiving the cookie containing the static and dynamic information portions, identifies the user from the account number in the static portion and accesses from an associated database the expected random number and sequence number that the billing server last sent to that user in the transaction-oriented dynamic portion. If the expected dynamic portion matches the received dynamic portion, the user is authenticated to proceed with the current transaction.

24 Claims, 3 Drawing Sheets

FIG. 2B

*BILLING SYSTEM*

- FROM FIG.2A (A) → TRANSACTION AUTHORIZED? (B208)
  - NO → SEND MESSAGE NOT AUTHORIZED (B209)
  - YES → SIGN AUTHORIZATION, ENCRYPT TRANSACTION, CREATE NEW RANDOM # AND INCREMENT SEQUENCE # FOR NEW COOKIE AND STORE, SEND TRANSACTION & SIGNATURE & NEW COOKIE (B210)
- PROCESS BILLING REQUEST, SEND ACKNOWLEDGMENT (B211)

*MERCHANT*

- DECRYPT TRANSACTION AND VERIFY SIGNATURE, POST "BILL" REQUEST, RECORD TRANSACTION, FULFILLMENT PROCESS (M203)
- RECEIVE ACKNOWLEDGMENT (M204)

*CLIENT*

- RECEIVE NON-AUTHORIZED TRANSACTION MESSAGE WITH DIRECTIONS TO CALL CUSTOMER ASSISTANCE (C206) → END
- APPROVE TRANS. POST SIGNED AUTHORIZATION TO MERCHANT INSTALL NEW COOKIE (C207)
- RECEIVE ACKNOWLEDGMENT [AND CONTENT] (C208) → END

METHOD AND APPARATUS FOR BILLING FOR TRANSACTIONS CONDUCTED OVER THE INTERNET

TECHNICAL FIELD

This invention relates to billing a user for transactions for services and/or goods provided and/or ordered over the Internet.

BACKGROUND OF THE INVENTION

On-line transactions between consumers and merchants on the World Wide Web (WWW) are becoming increasingly more numerous as the public becomes more facile in making purchases on the Internet. Such transactions can be for the purchase of "soft" goods, i.e., information, software and other material available in electronic form that can be delivered in real time to a user's client terminal. Such transactions can also be for the purchase of conventional "hard" goods, where the purchased merchandise are delivered off-line. Conventional on-line payment options generally involve the use of credit cards wherein the user provides his or her credit card number on-line or off-line to the merchant provider to pay for the "hard" or "soft" purchase to be delivered on-line or off-line.

Where the transactions involve a relatively small cost, for example $10 or less, the credit card system of payment is too expensive. Further, the credit card payment system excludes potential customers who do not have a credit card, or those who do but do not "trust" either providing their credit card number on-line, or do not want to use their credit card for such purchases. It would be advantageous, therefore, that some trusted transaction intermediary perform the functions of authenticating a user on the WWW and authorizing the transaction. Once such a transaction intermediary authenticates the user and authorizes the transaction, the merchant is alerted to provide the goods or services which are the subject of the transaction and an account associated with the user is billed for the transaction amount. Advantageously, once the user has registered with the transaction intermediary, no sensitive billing information, such as a credit card number, needs to be sent to the merchant.

In co-pending application Ser. No. 08/532,336 filed Sep. 22, 1995 by Y. Ronen, co-inventor herein, and assigned to the same assignee as the present application, a method of billing for services and/or goods ordered over the Internet from a merchant is disclosed. As described therein, the customer/user places a real or a virtual telephone call to the merchant's 900 telephone number and is charged by the telephone company an amount for that call that is representative of the cost of the goods or services being ordered via the Internet from the merchant's server. The merchant's server associates the 900-number telephone call with the request via the Internet for the goods or services in order to authenticate and authorize the transaction. In co-pending patent application Ser. No. 08/636,109 filed Apr. 22, 1996, co-invented by the same Mr. Ronen who is co-inventor herein, and assigned to the same assignee as the present application, a method of billing for transactions conducted over the Internet is disclosed in which a billing server connected on the Internet receives the IP address assigned to that user's client for the current user session and an indication of the user's identity from the user/customer's Internet Access Provider (IAP). In response to a chargeable transaction, the merchant's server transmits to a billing platform the IP address identity of the user making the transaction and the cost associated with the transaction. The billing server then cross-references the IP address associated with the cost of the transaction received from the merchant's server with the IP-address/user-identity relationship received from the IAP to properly charge an established account of the user for the transaction. Such an account is established by the user prior to the execution of the transaction for billing in a predetermined manner to, for example, the user's selected credit card, the user's debit card, the user's telephone account associated with his or her phone number, the user's merchant credit card, or other billing mechanism. For this billing methodology, arrangements thus need be established between billing server and the large number of different Internet Access Providers that provide Internet access to a tremendously large customer base since for each user's session the IAP must be programmed to forward to the appropriate billing server the relationship between the user's currently assigned IP address and identity.

A billing methodology that minimizes the steps that need be performed to obtain authorization and approval for an Internet transaction is therefore desirable. Further, a billing methodology that requires interactions between only the user, the merchant, and the provider of the billing service is advantageous.

SUMMARY OF THE INVENTION

A subscribing user who has registered with the provider of the billing system of the present invention may browse the home page of a merchant which has itself made previous arrangements with the provider of the billing system. While "visiting" the merchant's site, which has also registered with the billing system, the subscribing user is offered the option to purchase some good or service at a stated price for either on-line or off-line delivery. In response to the user's intent to purchase the selected item and be billed via the billing system, the merchant's digitally signed order is sent to the billing system for authentication and authorization of the transaction. Specifically, in accordance with the present invention, information previously provided to the user's client terminal's cookie file is transmitted to a billing server within the billing system. This information comprises a static information portion and a transaction oriented dynamic information portion, which are encrypted prior to transmission. The static information portion identifies the user through an assigned account number. The transaction oriented dynamic information portion comprises at least one sequence that was sent to the user's cookie file by the billing server upon a previous transaction, and is valid for only a single new transaction. The billing server, upon receiving from the user's browser program the cookie containing the encrypted static and dynamic information portions and decrypting same, identifies the user from the static portion, and accesses from an associated database the expected transaction oriented dynamic portion that the billing server last sent to that user. If the expected dynamic portion matches the received dynamic portion, the user is authenticated to proceed with the current transaction. The billing server, upon authentication of the user, then authorizes the specific transaction based on various criteria such as the user's credit limit, the cost of the transaction, etc. The billing server then sends to the user's browser a new cookie which contains the user's account identity in the static information portion and a new transaction oriented dynamic portion to be used by the user's browser for authentication of the user for a next transaction. Upon receipt, the user's browser program installs the new cookie and provides the user the opportunity to reject or finally approve of the transaction. If approved by the user, the order is sent to the merchant's server via the user's client terminal browser program. Upon receipt, the merchant's server posts the complete transaction information to the billing server for billing and provides for the delivery of the goods or services to the user. The customer's transaction is then confirmed through an acknowledgment sent via e-mail transmitted to the e-mail address associated with the account number. The billing server either after each transaction, or on a periodic basis, sends the transaction summary to a billing platform for billing of the user based on his or her registered billing preference such as a telephone bill, credit card charge, or a direct invoice. The billing platform then settles with the merchant after a fixed number of days, contingent on the user paying his or her bill.

In the specific embodiment of the present invention, the transaction oriented dynamic information portion of the cookie comprises a random number and a sequence number that are both assigned by the billing server. After each transaction, a random number is created by the billing server and sent back to the user's client terminal for use for the next transaction together with a sequence number that tracks the number of separate billing transactions conducted by the user associated with the static account number. The latter is incremented by one after each transaction. Both the random number and the sequence number are stored in a database associated with the billing server in a record associated with the user's account. As noted, the cookie is valid for only a single transaction. If a user's cookie file should be misappropriated from the user's client terminal or is intercepted during transmission from the billing server to the client terminal and is fraudulently used, a subsequent use by the actual registered user will cause the billing server to reject the user's cookie. The billing server will then request an ID and a password from the user for user authentication. By comparing the sequence number of the cookie received from the actual user with the sequence in the cookie stored in the billing server, a determination of which transactions are fraudulent made can be made. A new cookie containing a new random number is then placed by the billing server in the user's cookie file, thereby precluding further fraudulent use by the misappropriating cookie thief.

Advantageously, the authentication of a user making a transaction in accordance with the present invention does not require installation of any special software on the user's client terminal other than a browser which supports cookie files. Furthermore, the user can be automatically identified by the billing system with the cookie without requiring the user to enter an ID or password for every transaction. Even furthermore, the user is able to retain his or her anonymity with respect to the merchant, which a user may be desirous of doing.

BRIEF DESCRIPTION OF THE DRAWINGS

FIGS. 2A and 2B, referred to collectively hereinafter as FIG. 2, show the steps of a transaction flow involving the client terminal, the merchant server and the billing system in accordance with the present invention.

DETAILED DESCRIPTION

Figure 1:
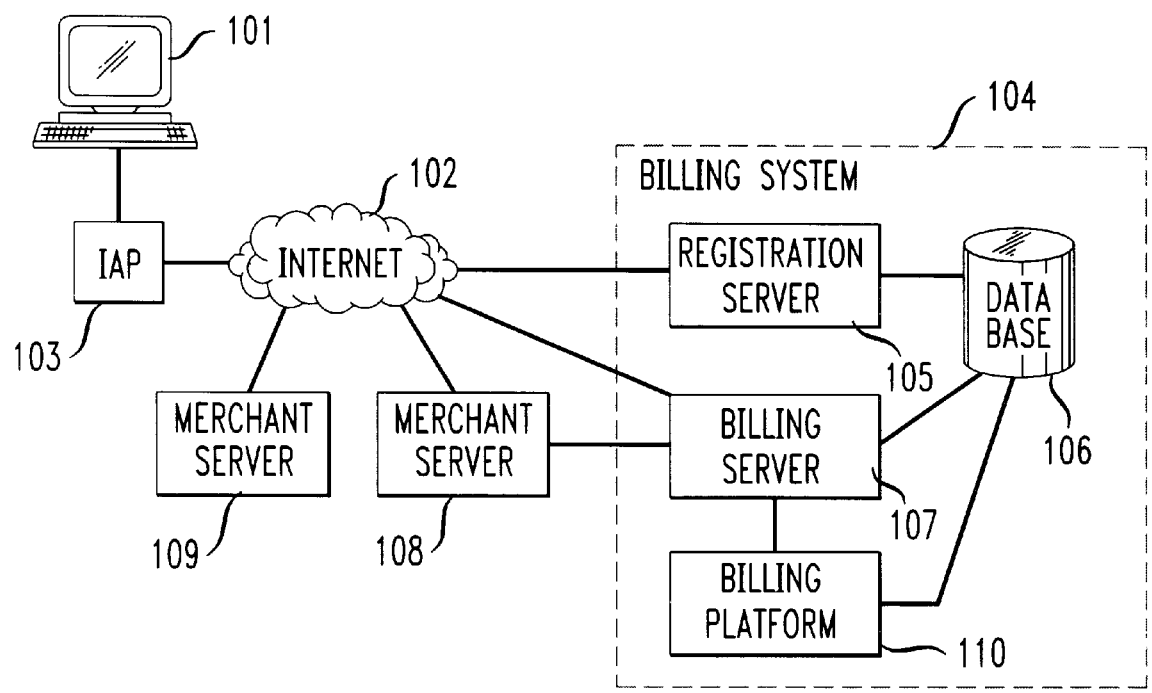
FIG. 1 is a block diagram of a system showing a billing system connected to the Internet for billing for transactions conducted by a user's client terminal with a merchant WWW server in accordance with the present invention.

With reference to FIG. 1, a user at a client terminal 101 is connected to the Internet 102 through an Internet Access Provider 103. The connection between the client terminal 101 can be, for example, through a Local Exchange Carrier (LEC) (not shown), through a cable TV network (not shown), or through another access medium. The client terminal 101 could also be connected directly to a Local Area Network which is directly connected to the Internet 102. The client terminal 101 runs a browser program which enables the user to "surf the Net" to visit various sites connected to the Internet. Some of these sites only provide information content and other sites may provide information in conjunction with offers of services and/or "soft" or "hard" goods with an associated cost. The services for a fee may include the delivery to the user of information itself, or the delivery of "soft" goods that can be delivered digitally on-line over the Internet to the client terminal, such as software, music, video, etc. If the user orders "hard" goods over the Internet, as for example clothing, delivery need obviously be made off-line. Some of these transactions that involve the delivery of information or a software program may have a relatively low cost to associated with them. Further, a user may visit such an on-line merchant's site only once or very infrequently. The present invention eliminates the need for the user to establish a financial relationship with the on-line merchant who is supplying the soft or hard goods that are the subject of the transaction. Thus, the user need not provide any financial information, such as a credit card or other personal information to the merchant to be assured initiation of the delivery process for the desired soft or hard goods or services. Accordingly, a user who has registered with the billing system 104 of the present invention and who enters into an on-line transaction with a registered merchant can obtain the transacted-for hard or soft goods or services without having to provide any personal information to the merchant, including his or her identity. The merchant, having registered itself with the billing system, can also be assured of receiving payment from the trusted provider of the billing system since it knows that each transaction will be user-authenticated and authorized by the billing system.

In order to conduct on-line transaction through the billing system 104, the user needs to register with the system. This registration occurs at the user's initiative, by posting information via the Internet to a registration server 105 within billing system 104 or by paper (e.g., fax or mail), or by telephone. The registration process occurs once per user. The process allows a user to establish an account, which requires a billing name, address, e-mail address, and billing preferences for charges made to the account. The latter may include a direct bill to an email address or to the postal address associated with the user's telephone number, or to a telephone bill (LEC or Interchange carrier), or to a user's credit card or debit card. These preferences can be distributed amongst different billing mechanisms as a function of the type of transaction being billed. Thus, the user can direct that all transactions of less than a predetermined cost be billed to his or her telephone bill, and those of greater than that cost be billed to his or her credit card. Also, the user can direct transactions of a certain type, such as purchases of software to be direct-billed and other types be billed according to the cost of the goods as noted above. Other information unique to the user, such as a password, is also obtained in the registration process that can be later used to validate the billing information. The information can be updated when the user's billing information changes, or additional users need to added/removed from an specific account. If entered on-line through registration server 105, the information is stored in a database 106 for later retrieval. If received from the user by another methodology, the information is entered by an operator associated with the billing system 104 and stored in database 106.

Upon activation of the account, the billing server assigns and deposits a cookie on the browser program running on user's client terminal 101, which in turn transmits it back to the billing system 104 during the course of a transaction. Cookies are well known in the art. Cookies are described, for example, in Netscape Support Documentation found on the Internet at http:/home.netscape.com/newsref/std/cookie_spec.html. The cookie is sent to the client by including a Set-Cookie header as part of an HTTP response. The Set-Cookie is sent by the billing server 107 and is generated by a CGI script in the following format:

Set-Cookie: NAME=VALUE [;expires=DATE][;path=PATH]
[;domain=DOMAIN_NAME][;secure]

The cookie is stored in a text file (e.g., Netscape cookie.txt file) on the client terminal 101 and is sent to the originating billing server 107 to its domain when the client terminal makes a request to DOMAIN_NAME, specifically the URL associated with the billing server 107. Although the Netscape browser uses one data file for all cookies, with one line being used per cookie in the file, other browser such at MS Internet Explorer, use a separate data file for each cookie. For either, the cookie remains valid until its expiration on DATE. In accordance with the present invention, the cookie VALUE is an encrypted string that comprises in its decrypted form a static information portion and a dynamic information portion. The static portion is an alpha-numeric string identifying the user's account number as it is stored in database 106. The dynamic portion includes a random number generated by the billing server and a sequence number that is stored in database 106 in association with the user's account number. That sequence number is initialized at one (or any other value) when the user first registers with the billing platform and is subsequently incremented by one (or any other positive or negative predetermined number or algorithm) each time the user makes a separate transaction. The cookie thus initially deposited by the billing server 107 into the user's cookie file in its decrypted form thus contains a string comprising the user's account number, a random number generated by the billing server 107, and a sequence number having a value of one. The billing server stores the generated random number and the sequence number in database 106 in a record associated with the user's account number that has been created.

As the user on client terminal 101 subsequently "surfs the Net", he or she will link to the home page of various merchants' servers 108 and 109. When linking to the home page of a particular merchant's server 108 which has entered into a billing agreement with the provider of the billing system 104, the user is offered the option to purchase some item at a stated price using the payment option provided by the subscribed-to billing system 104. When the user clicks on an order page, representing the intent to purchase the selected item and to be billed through the billing system 104 via his or her account established therein, the merchant's signed order is sent to billing system 104 for authentication of the user and authorization for the transaction. At the same time the information stored in the cookie file on the user's client terminal is transmitted to billing server 107.

The user is then authenticated by the billing system 104 using the information in the received cookie. Specifically, the received cookie is decrypted and the VALUE of the decrypted cookie received by the billing server is parsed into the static user account identity portion and the dynamic random number and sequence number portions. The identity of the requesting user is determined from the account ID in the static information portion of the VALUE string. The random number and the sequence number in the dynamic information portion are then compared with the random number and the sequence number stored in database 106 for the record associated with the determined account number. If a match is made, the user is authenticated for the transaction.

There may be cases when the cookie cannot be used. The cookie may have been expired, or a cookie file in a user's browser program may have been erased, or the browser program may have disallowed the writing into a cookie file. Also, there may be other legitimate reasons in which there is not a match between the cookie sent from the user's client terminal to the billing server and the cookie stored in the database 106 for that user. The latter could arise when the user uses another browser to make an on-line billing system-billed purchase from a client terminal other than the one in which the cookie was originally deposited. In any such cases in which a cookie match cannot be made, the user is prompted for a login name and a password, which are chosen by the user during the registration process. If the billing system detects that the cookie information is incorrect, but the user has correctly provided the login name and password, the billing system will deposit a cookie on the user's browser. However, to ensure that the user is aware that a cookie is being deposited, and that it can provide automatic authentication for a subsequent billing system-based purchase from that browser on that client terminal, the billing system posts a message to the client terminal requesting the user to affirmatively acknowledge, through an interactive click, that they wish to save their billing system account information on that client terminal for subsequent transactions.

There may also be situations in which the user may find it desirable to and force the entry of an ID and a password for each transaction to provide added security. Such a situation may arise when multiple users share a common client terminal, as in a household. Thus, by providing the user with the option to disable the cookie, the user will be forced to enter an ID and a password for transaction authentication.

If the cookie provided to the billing system from the user's client terminal does not match the cookie stored in the database 106 for the requesting user, a possibility exists that a fraudulent use of the user's account has been made by someone who has misappropriated the user's cookie from either the client terminal's cookie file, or through on-line eavesdropping of the transmission of the cookie to the client terminal. If the cookie has been stolen and used to make a fraudulent transaction, the thief may have been able to make successive such transactions by receiving a new cookie after each transaction that would enable a next transaction to be made. Each such fraudulent transaction will generate a new cookie with a new random number and an incremented sequence number. When the legitimate user attempts to later make a transaction, the cookie then stored in his or her client terminal's browser program will no longer match the cookie stored in database 106 for that client. The user will thus be initially rejected but will be authenticated through the input of a valid account number and password. By comparing the sequence number of the cookie then stored in database 106 for that user's account with the sequence number of the cookie in the cookie file stored in the user's client terminal, the identity and the number of fraudulent transactions can be determined. Thus, for example, if the sequence number of the user's cookie is 27 and the sequence number in the cookie stored in database 106 for that user's account is 30, then the last three transactions were fraudulently made to the user's account assuming that each transaction increments the sequence number by one. Once such a fraud has been detected, a new cookie is deposited in the user's cookie file, thereby precluding further use by the thief of the misappropriated cookie or its successively generated cookies.

Assuming that the user has been authenticated, the transaction needs to be authorized by the billing system. When the user "clicks-to-buy", which is the stage in the merchant-user electronic shopping web interface when the user has confirmed a willingness to complete the transaction with the stated terms, the transaction must be authorized. The order information, digitally signed by the merchant is sent through the user's client terminal's browser to the billing system 104. The order amount, combined with the cookie file containing the user's account ID number and transaction number, provide sufficient information to query the user's profile stored in database 106 to verify if the transaction should be authorized. Authorization for the transaction will be granted if (1) the user is registered as active in the billing system; (2) the merchant is registered with the billing system; (3) the user is not blocked from making purchased based on payment history; (4) the purchase amount does not exceed a per-transaction limit specified by the user upon registration; (5) the purchase amount does not exceed the billing system's specified cumulative credit limit; and (6) the purchase does not violate any customer-specified restrictions (e.g., block transactions during certain times) or preferences (e.g., block transactions for certain types of merchandise). If authorization is denied, a message is displayed on the user's browser indicating that the purchase cannot be authorized and inviting the user to contact a customer assistance representative at a specified phone number. Additional criteria can also be used to determine whether or not to authorize a specific transaction.

After the user has been authenticated and the transaction authorized, an authorization token, which is the digital signature of the order created by the billing system 104 using its private key, along with the order form encrypted using the merchant's public key, is generated by the billing system and sent to the user's browser together with a summary of the order and the charges for final approval by the user of the charges. The user can retain the authorization token for later proof of the order and charges. Also sent to the user's browser by the billing server 107 is a new cookie having a VALUE field containing the static user's account ID information portion and a dynamic information portion comprising a newly created random number and an incremented sequence number. This new cookie is for use by the user's browser program for a next transaction.

Following the user's final approval of the charges, which may occur by the failure of the user to affirmative cancel the order, the token and the order are sent to the merchant's server 108 via the user's client terminal's browser. Receipt of the authorization token verifies to the merchant that the transaction has been authorized by the billing system. Software running on the merchant server 108 verifies the authorization and delivers the requested goods to the user. This may happen in real time for "soft" goods. For "hard" goods, the merchant provides an acknowledgment to the user that the ordered merchandise is being shipped or the order has been processed. For "soft" goods, the merchant's server 108 posts the complete transaction information (i.e., authorization token, order information) to the billing system 104 for billing by a billing platform 110. For "hard" goods, certain state and federal regulations may require that for some types of merchandise the transaction cannot be posted until the goods are shipped, while others (e.g., catalog sale of goods) are permitted to post after the order is accepted. The billing server 107 sends the transaction information, appropriately formatted to the billing platform 110 for billing the user based on the user's billing preferences as stored in database 106. Upon payment of the bill by the user, the billing system settles with the merchant.

At the end of the user's Internet session, or periodically if there is any activity related to the user's account, the billing system transmits an email summary to the account holder showing all the transactions conducted over a period of time. The information provided shows the transaction ID, the amount, date/time of purchase and merchant name.

Figure 2A:
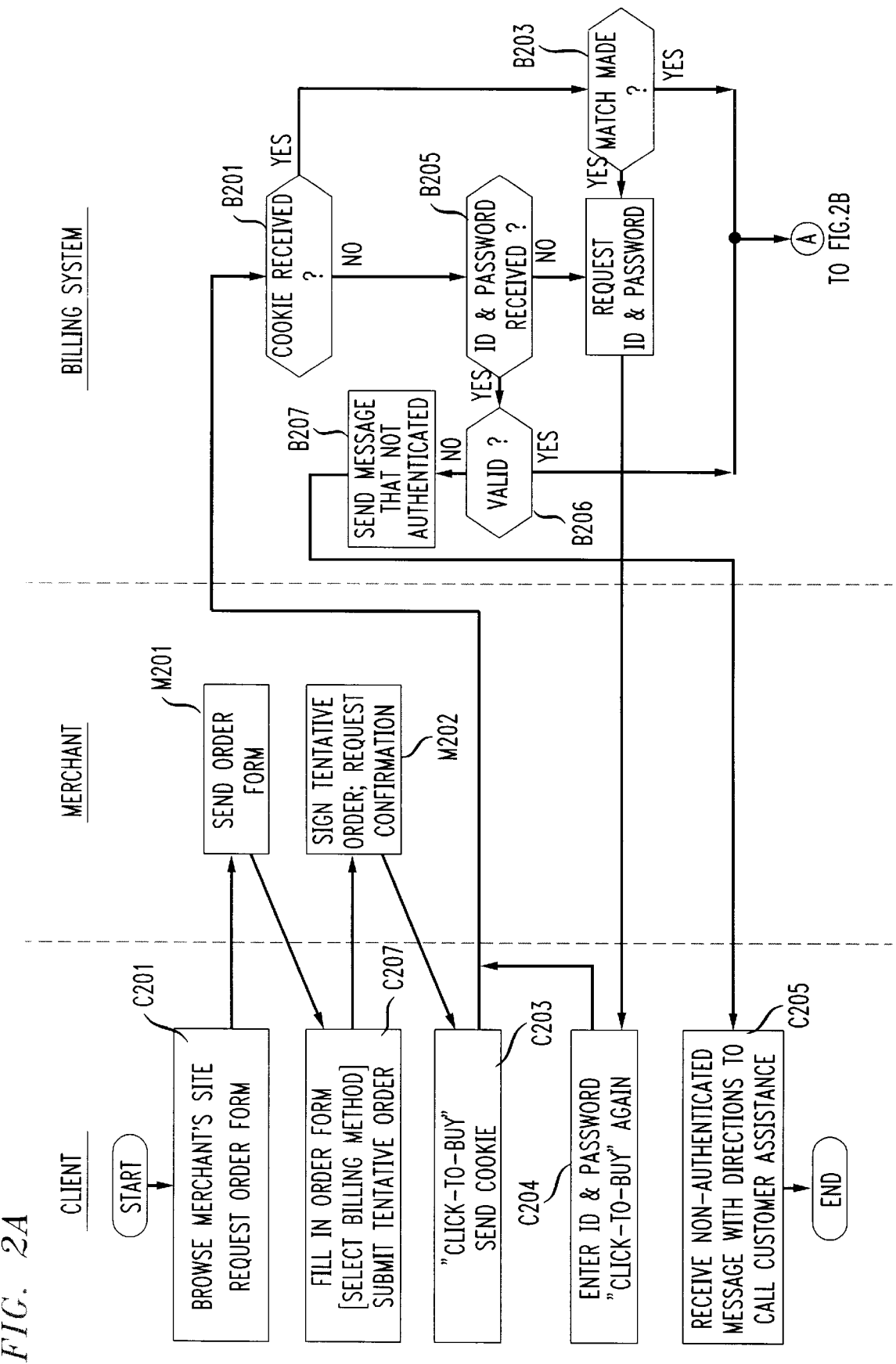

With reference to FIG. 2, the interactive steps are shown between a user at a client terminal browsing on the Internet and making an on-line purchase, the merchant server with which the transaction is made, and the billing system of the present invention which automatically authenticates the user, authorizes the transaction, and bills for the purchase. At step C201 the user browses the merchant's site and requests an order form for ordering some good from the merchant. At step M201, the merchant's server responds by sending the requested order form to the client terminal. At step C202, at the client terminal the user fills in the order form, optionally may select a billing method, and submits the tentative order back to the merchant. The merchant then must verify the order (availability, pricing, etc.) and calculate a final price. The merchant at this stage does not have a valid transaction number from the billing system, nor the user's account ID on the billing system. At step M202 the merchant constructs a message consisting of: a merchant ID, a time-stamp, an optional merchant transaction ID or order number, a transaction amount, and optional other order data such as type of request and expiration date for an offer. The message is hashed into a digest and signed by the merchant's private key. The message data, signature, and merchant's certificate are wrapped and encrypted and returned to the client with a request for confirmation of the order. At step C203, the user confirms the order by a "click-to-buy" input for which an icon is provided on the HTML page returned to the client and which provides a link to the billing system. When the user clicks on this icon, the request for authorization is routed to the billing system over a Secure Socket Layer (SSL) link, in which the merchant's signed order is embedded. In addition, the cookie stored in the user's cookie file on the browser program is sent to the billing system as well. The billing system, upon receiving the cookie and the order information will first authenticate the user. At step B201, a determination is made whether a cookie is received. If a cookie is not received, the process proceeds to step B205 where a determination of whether a user ID and a password have been received. If yes, at step B206 a determination of whether that ID and password are valid is made. If not, at step B207, a message is sent back to the client terminal to inform the user at step C205 that they have not been authenticated and to call a customer assistance number. If a valid ID and password are found at step B206, the process passes to step B208 where transaction authorization will take place. If neither a cookie is received at step B201, nor an ID and a password are received at step B205, then the billing system sends a request back, at step 203, to the client requesting an ID and a password. Similarly, if a cookie is received at step 201, at step B202, the received cookie is compared with the cookie stored in the billing system for the user identified from the static information portion of the cookie. If a match is made, the user is authenticated and the process passes to step B208 for transaction authorization. If a match is not made at step B202, then the process passes to step B203, where the billing system issues a message requesting an ID and a password from the user. In response to the request for a user ID and password from step B203, generated in response to either steps B205 of B202, at step C204 the user enters his or her ID and password and enters a "click-to-buy" input again. If a valid password and ID are returned, the process passes through steps B201, B205, and B206 for authorization at step B208. If a valid password and ID are not returned, then the process passes through steps B201, B205, B206 and B207 to send a message of non-authentication to the user attempting to make the transaction.

At step B208, a determination is made whether the transaction is authorized. To do this, the encrypted message containing the original order, the merchant's signature and the certificate are decrypted. The billing system then determines whether the transaction can by authorized. As previously noted, a transaction is authorized if the user is registered in the billing system database, the merchant is registered with the billing system, the user is not blocked from making purchases based on payment history, the purchase amount does not exceed a per-user specified limit, and the purchase does not violate any customer-specified restrictions or preferences. If the transaction is not authorized, at step B209, a message is returned to the merchant through the user's browser indicating that the transaction was unable to be authorized. At step C206, the user receives the message with directions to call a specified customer assistance number for further information.

If the transaction is authorized at step B208, at step B210 an authorization response is prepared for transmission to the user for final approval of the transaction and then for forwarding, upon such approval to the merchant. The billing system adds a transaction ID, an authorization time-stamp, an authorization code, and an authorized transaction amount, together referred to as the authorized transaction data. The authorized transaction data, the billing system signature and certificate are then encrypted. In addition, a new random number is created and the sequence number is incremented to create a new cookie, which is sent back to the user with the encrypted transaction and signature over a SSL link. At step 207, the user is asked to accept the charges requested by the merchant. If accepted, the encrypted signed transaction data is sent to the merchant. The new cookie is also installed in the user's browser program. At step M203, the transaction data is decrypted and the signature verified. The transaction is then fulfilled either by the real-time on-line delivery of the goods or initiating processing for off-line delivery of the ordered merchandise. The transaction is recorded by the merchant and a bill request is posted to the billing system. At step C208, the user receives an acknowledgment that the order has been received and the content of the order, if the latter is delivered on-line. At step B211, the billing server processes the billing request, billing the user in accordance with the registered billing preference and sends an acknowledgment to the merchant that the user has been billed. At step M204, the merchant receives that acknowledgment and later receives payment from the billing system for the goods provided to the user.

Although described above in conjunction with the delivery to the user of goods after billing has been effected, the present invention could equally apply to a scenario in which the goods are delivered to the user on-line before payment is made, such as for shareware. In this scenario, the merchant first downloads the goods to the user and then offers the user to pay with the direct billing payment option of the present invention. Alternatively, the user can be authorized to make purchases for a specific dollar amount, before any items are selected for purchase, and the customer is then allowed to browse and choose items for purchase up to the authorized amount. After the user has selected all items, the actual dollar amount spent, which is less than or equal to the authorized amount, is posted to the billing system.

Although described in conjunction with the authentication of a user for a transaction for the delivery of goods that is being conducted on the Internet, the principles of the present invention could be applied to the authentication of a user for any type of transaction that is being conducted over any type of data network.

The above-described embodiments are illustrative of the principles of the present invention. Other embodiments could be devised by those skilled in the art without departing from the spirit and scope of the present invention.

The invention claimed is:

1. A method of authenticating a user for a transaction on a data network comprising:

sending to a user's client terminal data containing a static information portion and a transaction-oriented dynamic portion, the static information portion identifying an account associated with the user and the transaction-oriented dynamic information portion containing information generated for that user that is valid for a single subsequent transaction;

storing the transaction-oriented dynamic information portion in association with the static information portion;

receiving, from the user's client terminal, the data containing the static information portion and the transaction-oriented dynamic information portion in association with information relating to the single subsequent transaction;

identifying the user's account from the received static information portion;

comparing the transaction-oriented dynamic information portion received from the user's client terminal with the transaction-oriented dynamic information portion stored in association with the static information portion; and authenticating the user for the single subsequent transaction if the received transaction-oriented dynamic information portion matches the stored transaction-oriented dynamic information for the account associated with the user.

2. The method of claim 1 further comprising:

creating a new transaction-oriented dynamic information portion;

sending to the user's client terminal new data to replaced the previously sent data, the new data containing the same static information portion in the previously sent data and the new transaction-oriented dynamic information portion, the new transaction-oriented dynamic information portion being different than the transaction-oriented dynamic information portion in the previously sent data, the new data being valid for authenticating the user for a next single transaction; and storing the new transaction-oriented dynamic information portion in association with the same static information portion.

3. The method of claim 2 wherein the transaction-oriented dynamic portion of the data previously sent to the user's client terminal and the new transaction-oriented dynamic information portion each comprise a random number and a sequence number.

4. The method of claim 3 wherein the new transaction-oriented dynamic portion comprises a random number different than the random number in the data previously sent to the user's client terminal and a sequence number that is equal to the sequence number in the data previously sent to the user's client terminal plus a predetermined increment.

5. The method of claim 1 wherein the data network is the Internet.

6. The method of claim 5 wherein the data is contained within a cookie.

7. The method of claim 1 wherein the static information portion and the transaction-oriented dynamic information portion of the data are encrypted.

8. A method for authenticating a user for a transaction on the Internet comprising:

sending to a user's client terminal a cookie containing a static information portion and a transaction-oriented dynamic portion, the static information portion identifying an account number associated with the user and the transaction-oriented dynamic information portion containing information generated for that user that is valid for a single subsequent transaction;

storing the transaction-oriented dynamic information portion in association with the user's account number identified by the static information portion;

receiving from the user's client terminal the cookie containing the static information portion and the transaction-oriented dynamic information portion in association with information relating to the single subsequent transaction;

identifying the user's account number from the static information portion in the received cookie; and comparing the transaction-oriented dynamic information portion in the received cookie with the stored transaction-oriented dynamic information portion associated with the identified user's account number.

9. The method of claim 8 further comprising authenticating the user for the transaction if the transaction-oriented dynamic information portion in the received cookie matches the stored transaction-oriented dynamic information portion.

10. The method of claim 8 further comprising:

if the transaction-oriented dynamic information portion in the received cookie does not match the stored transaction-oriented dynamic information portion, requesting an account number and a password from the user receiving the account number and password from the user in response to the request; and if the received password matches a stored password associated with the user's account number, authenticating the user for the transaction.

11. The method of claim 9 further comprising:

creating a new cookie with a new transaction-oriented dynamic information portion and the same static information portion in the cookie previously sent to the user;

sending the new cookie to the user's client terminal to replace the previously sent cookie; and storing the new transaction-oriented dynamic information portion in association with the user's account number.

12. The method of claim 8 wherein the transaction-oriented dynamic information portion of the cookie comprises a random number and a sequence number.

13. The method of claim 12 wherein the sequence number in the transaction-oriented dynamic information portion of the new cookie is equal to the sequence number in the cookie previously sent to the user's client terminal plus a predetermined increment.

14. The method of claim 8 wherein the transaction-oriented dynamic information portion and the static information portion of the cookie are encrypted.

15. The method of claim 10 further comprising:

if the received password does not match a stored password associated with the user's account number, denying the transaction.

16. The method of claim 8 further comprising:

if the transaction-oriented dynamic information portion in the transition-oriented received cookie does not match the stored transaction-oriented dynamic information portion, denying the transaction.

17. The method of claim 13 further comprising:

if the transaction-oriented dynamic information portion in the received cookie does not match the stored transaction-oriented dynamic information portion, determining whether any fraudulent transactions were made on the user's account.

18. The method of claim 17 wherein the step of determining whether any fraudulent transaction were made comprises:

comparing the sequence number in the cookie received from the user's client terminal with the sequence number in the stored cookie; and identifying fraudulent transactions from the difference between the sequence number in the cookie received from the user's client terminal and the sequence number in the stored cookie.

19. A system for authenticating a user for a transaction on the Internet comprising:

means for sending to a user's client terminal a cookie containing a static information portion and a transaction-oriented dynamic information portion, the static information portion identifying an account number associated with the user and the transaction-oriented dynamic information portion containing information generated for that user that is valid for a single subsequent transaction;

means for storing the transaction-oriented dynamic information portion in association with the user's account number identified by the static information portion;

means for receiving from the user's client terminal the cookie containing the static information portion and the transaction-oriented dynamic information portion in association with information relating to the single subsequent transaction;

means for identifying the user's account number from the static information portion in the received cookie; and means for comparing the transaction-oriented dynamic information portion in the received cookie with the stored transaction-oriented dynamic information portion associated with the identified user's account number.

20. The system of claim 19 wherein the user is authenticated for the transaction if the transaction-oriented dynamic information portion in the received cookie matches the stored transaction-oriented dynamic information portion.

21. The system of claim 20 wherein the transaction-oriented dynamic information portion of the cookie comprises a random number and a sequence number.

22. The system of claim 21 wherein the sequence number in the transaction-oriented dynamic information portion of the new cookie is equal to the sequence number in the cookie previously sent to the user's client terminal plus a predetermined increment.

23. The system of claim 21 wherein the transaction-oriented dynamic information portion and the static information portion of the cookie are encrypted.

24. The system of claim 19 wherein the transaction is denied if the transaction-oriented dynamic information portion in the received cookie does not match the stored transaction-oriented dynamic information portion.

* * * * *